(12) United States Patent
Ellison et al.

(10) Patent No.: US 7,845,015 B2
(45) Date of Patent: *Nov. 30, 2010

(54) PUBLIC KEY MEDIA KEY BLOCK

(75) Inventors: Carl M. Ellison, Portland, OR (US);
Brendan S. Traw, Portland, OR (US);
Michael S. Ripley, Hillsboro, OR (US);
Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 11/923,635

(22) Filed: Oct. 24, 2007

(65) Prior Publication Data

US 2008/0075284 A1 Mar. 27, 2008

Related U.S. Application Data

(63) Continuation of application No. 10/316,595, filed on Dec. 10, 2002, now Pat. No. 7,305,711.

(51) Int. Cl.
*H04N 7/16* (2006.01)
*G06F 12/14* (2006.01)
(52) U.S. Cl. .................................. 726/29; 713/193
(58) Field of Classification Search .................. 726/29; 713/193
See application file for complete search history.

(56) References Cited

U.S. PATENT DOCUMENTS

| 5,883,958 | A * | 3/1999 | Ishiguro et al. | 705/57 |
| 6,950,948 | B2 * | 9/2005 | Neff | 705/12 |
| 7,017,064 | B2 * | 3/2006 | Thomas et al. | 713/400 |
| 7,089,426 | B1 * | 8/2006 | Bagshaw | 713/193 |
| 7,131,004 | B1 * | 10/2006 | Lyle | 713/169 |
| 2002/0147906 | A1 * | 10/2002 | Lotspiech et al. | 713/158 |

FOREIGN PATENT DOCUMENTS

| JP | 06-244832 A | 9/1994 |
| JP | 10-65662 A | 3/1998 |
| JP | 11-220462 A | 8/1999 |
| JP | 2000-148939 A | 5/2000 |
| JP | 2002-271314 A | 9/2002 |

* cited by examiner

*Primary Examiner*—Michael Pyzocha
(74) *Attorney, Agent, or Firm*—Caven & Aghevli LLC

(57) ABSTRACT

Protected content distribution is accomplished by a first entity generating a set of asymmetric key pairs, creating a plurality of sets of private keys by selecting a combination of private keys from the set of asymmetric key pairs for each created set, and distributing the sets of private keys to playback devices. A second entity produces protected content including encrypted content and a public key media key block, encrypts a symmetric content key with each public key in the set of asymmetric key pairs to form the public key media key block and encrypts a content title with the symmetric content key to form the encrypted content. A playback device stores one set of private keys, receives the protected content, and decrypts and plays the content title stored in the protected content when a selected one of the set of private keys stored by the playback device successfully decrypts the encrypted symmetric content key stored in the public key media key block of the received protected content.

18 Claims, 3 Drawing Sheets

PUBLIC KEY MEDIA KEY BLOCK

CROSS REFERENCE TO RELATED APPLICATIONS

This application is a Continuation of U.S. patent application Ser. No. 10/316,595, entitled "Public Key Media Key Block," with inventors Carl M. Ellison, et al., filed on Feb. 10, 2002.

BACKGROUND

1. Field

The present invention relates generally to content protection and, more specifically, to distribution of keys to authorized receivers.

2. Description

Cryptographic techniques may be used to protect distributed content. In one system used for protecting content on digital versatile disks (DVDs), a single symmetric key is assigned to each manufacturer of DVD players. The DVD player uses the shared symmetric key embedded within the device to decrypt the content on the DVD and play it for a user. This scheme promotes anonymity because the shared key cannot be used to identify an individual user's device. However, if one of the manufacturer's devices is attacked and the shared symmetric key is compromised, the key may be communicated to others to pirate the content. To attempt to stop this activity, the manufacturer may wish to revoke authorization of the key, thereby preventing further usage of the shared key. However, revocation of the single shared key would render all of the manufacturer's devices inoperable. Thus, despite supporting anonymity, this scheme does not practically support revocation of compromised keys.

Another system uses individual symmetric keys for each device. When a key is compromised, the compromised key may be added to a revocation list. The revocation list may be communicated to the playback device so that the device may know that it's key has been revoked, and thus playback of the content may be prevented. However, when many keys are compromised over time, the revocation list of compromised keys to be sent to playback devices may become large and unmanageable. Additionally, there must be a communications path between an entity managing the revocation list and each playback device. If the number of playback devices becomes large (in the thousands or millions), then distribution of updated revocation lists becomes problematic. In addition, having an individual key for a unique device may raise privacy concerns, because the user's device is not considered to be anonymous.

A technique for distributing keys to playback devices is needed that overcomes the deficiencies of prior systems. Such a technique should permit efficient revocation of compromised keys and also promote anonymity for users and their devices. Furthermore, such a technique should be practical for "off-line" non-interactive scenarios, where no direct communications link to the playback device is available.

BRIEF DESCRIPTION OF THE DRAWINGS

The features and advantages of the present invention will become apparent from the following detailed description of the present invention in which.

DETAILED DESCRIPTION

Figure 1:
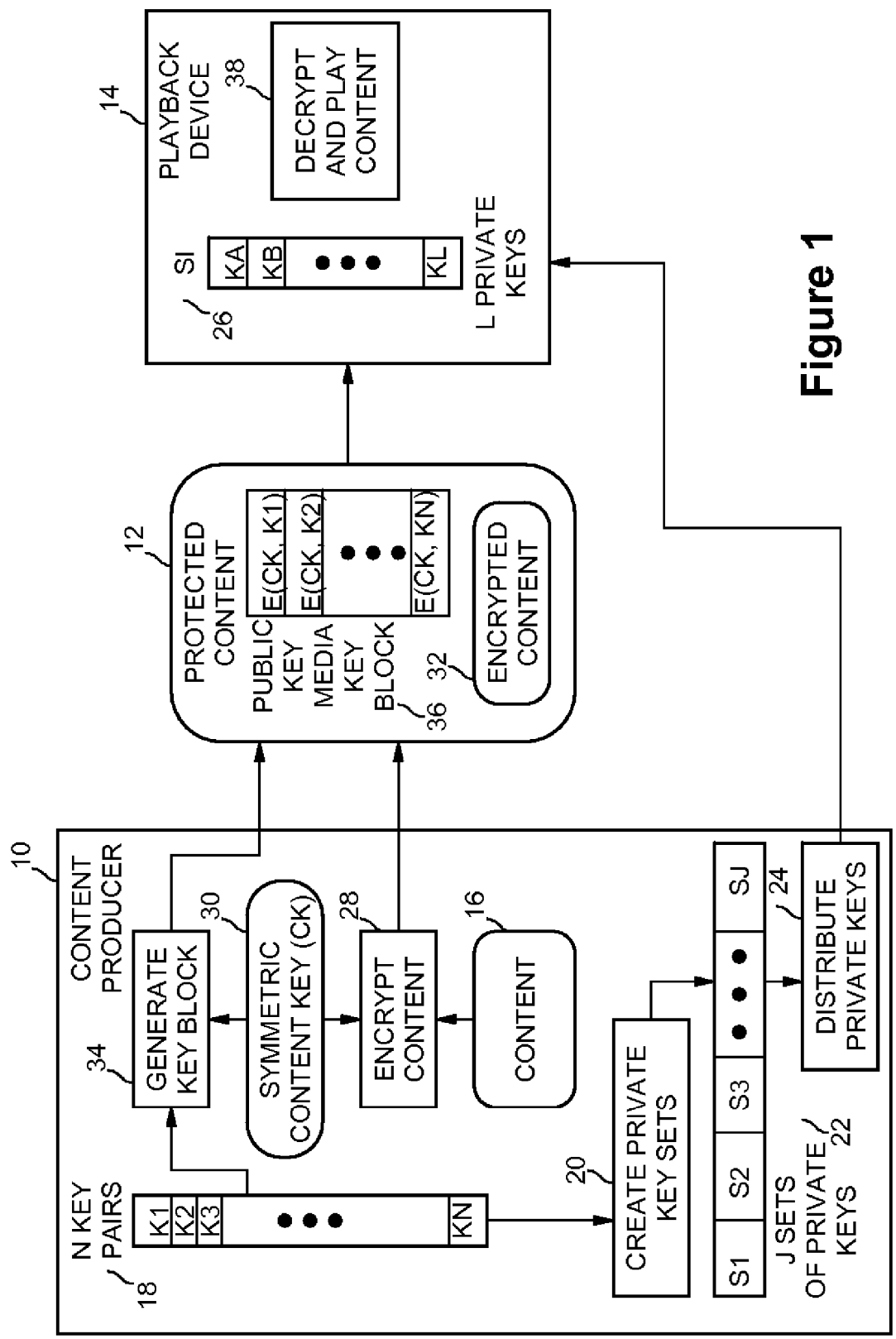
FIG. 1 is a diagram of a system for distributing content using a public key media key block system according to an embodiment of the present invention.

An embodiment of the present invention comprises a method and apparatus for distributing a public key media key block and encrypted content from a content producer to a playback device such that cryptographic keys used to obtain access to the encrypted content may be revoked, but anonymity of the playback device is supported. Embodiments of the present invention may be useful for non-interactive, off-line channels of distribution of content on storage mediums such as DVDs, and one-way channels such as radio and television (TV).

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In one scenario, a content producer desires to distribute valuable content in a protected format to many content consumers. The content producer wants the distributed content to be in a format that is readable only by authorized playback devices. The content producer may use cryptographic methods to encrypt the content prior to distribution, using a combination of symmetric and asymmetric techniques. The content may be encrypted using a symmetric content key, because continuously decrypting large quantities of content data by the playback device using a symmetric content key may be more computationally efficient than using asymmetric methods. The symmetric content key needed to decrypt the content at the site of content consumption must be communicated to the authorized playback device at that site in some way. It is highly desirable that the symmetric content key is protected during transmission to the playback device, and protected upon reception. In one embodiment, each content title may be encrypted by a content producer with a different symmetric content key (as used herein, a content title refers to a single consumable product, such as a movie, a television program, a record album, etc.) That is, all copies of a particular content title may be encrypted with the same symmetric content key. If this symmetric content key is compromised, other copies of the content title are at risk, but other content titles are not. In another embodiment, sets of copies of a content title may be encrypted with different symmetric content keys. If a particular symmetric content key is compromised, only those copies in the set of copies associated with that key are at risk, but other copies and titles are not.

In one embodiment, the symmetric content key may be protected by encrypting the symmetric content key using a public key of an asymmetric key pair and an appropriate public key encryption algorithm prior to distribution of the symmetric content key to the playback device. The corresponding private key is stored in the playback device by a device manufacturer at the time of manufacturing the playback device, to be used for decrypting the encrypted symmetric content key during playback of the content. When the content is distributed on a storage medium such as a DVD, a data structure on the DVD called a media key block may be used to store the encrypted symmetric content key. When the content is distributed over a one-way broadcast network (such as radio or television (either over-the-air, cable, or satellite)), the media key block may comprise one or more of the first packets of content data.

To promote better security, multiple asymmetric key pairs for protecting the symmetric content key may be used. A set of private keys may be stored in a secure manner on a playback device by a device manufacturer at the time of manufacturing the playback device. A selected one of the private keys may be used to decrypt an encrypted symmetric content key for a copy of a content title. When the playback device receives the content, the playback device reads the media key block and uses the selected one of the private keys to decrypt the symmetric content key. The decrypted symmetric content key is then used to decrypt the content during playback.

When it becomes known by the content producer that one of the set of private keys has been discovered, typically through unauthorized activities by a "hacker", it becomes desirable to revoke the authorization of the compromised private key and switch to using another key in the set of keys stored in the playback device for all subsequent content distribution. In prior art methods, the information concerning the revoked private key would have been communicated to the playback device to assist in preventing further unauthorized playback of content. However, this requires an "on-line", interactive and bi-directional communications path between the content producer/distributor and the playback device so that the set of private keys in the playback device can be updated. When the content is distributed on a storage medium such as a DVD and/or no bi-directional communications path exists between the content producer and the playback device, effective revocation is difficult to achieve. However, embodiments of the present invention implement an effective revocation scheme while still providing anonymity for the playback devices.

FIG. 1 is a diagram of a system for distributing content using a public key media key block system according to an embodiment of the present invention. A content producer 10 desires to distribute protected content 12 to playback device 14. Content producer 10 may be any entity producing and/or distributing content. For example, as used herein, a content producer may be a movie studio, a television (TV) program production company, a film or TV distributor, an author, an artist, a recording artist, a record company, a publisher, a TV broadcast network, or any person or entity creating and/or distributing content. Protected content 12 comprises content 16 in a format of protection as described herein. Content 16 may be any data represented in any content format now known or hereafter developed. In one embodiment, the content may be stored and distributed on any appropriate storage medium now known or hereafter developed. In one embodiment, the storage medium comprises a digital versatile disk (DVD). In another embodiment, the protected content is distributed over a one-way broadcast transmission mechanism to the playback device. Playback device 14 comprises any device for receiving the protected content and rendering the content for perception by a user. In various embodiments, the playback device may comprise a personal computer (PC), a TV, a personal video recorder (PVR), a DVD player, a handheld computer, a personal digital assistant (PDA), a set top box, a cellular telephone, an Internet tablet, an electronic book device, or any other consumer electronics device capable of receiving and rendering content.

In one embodiment, there may be many playback devices denoted M herein. The number of playback devices may be very large, such as hundreds of millions of devices (e.g., on the order of $10^8$). A key generating entity defines a set of N public/private key pairs ($K_1, K_2, K_3, \ldots K_N$) 18. The key pairs may be used with any public key encryption/decryption algorithms now known or hereafter developed. In one embodiment, the entity may be a content producer 10. In other embodiments, the entity may be a content distributor, publisher, broadcast network, manufacturer, etc. In one embodiment, the N key pairs may be generated by a central authority entity, the public keys may be published, and the private keys may be distributed to device manufacturers. In one embodiment, the central authority may be an organization to promote security for content distribution. In one embodiment, the number of key pairs N may be on the order of $10^6$ (e.g., in the millions). The key generating entity creates 20 J sets of private key pairs ($S_1, S_2, S_3, \ldots S_J$) 22. Each set in the J sets of private keys 22 may comprise L private keys selected from the set of N key pairs. In one embodiment, L may be 16, however, in other embodiments other sizes of L may be used. The number of sets J may be between one and $N!/(L!*(N-L)!)$. Each set may be allocated according to a selected allocation scheme. For example, private keys in a set $S_i$ may be allocated from N at random, partitioned into groups by manufacturer, or allocated according to geography using random, tree, or matrix key allocation schemes. Other key allocation methods are within the scope of the present invention.

Sets of unique private keys S may be distributed 24 by the entity to playback devices. When a playback device is manufactured, the manufacturer stores a unique set of private keys $S_i$ 26 from the set J in a playback device. In one embodiment, the set $S_i$ 26 may be stored in a trusted platform module (TPM) within the playback device. The TPM may provide security against tampering. Each playback device comprises a unique set of private keys $S_i$ 26 from the J sets of private keys possible from the N key pairs. After manufacture, playback devices are distributed to users through normal commercial channels.

Figure 2:
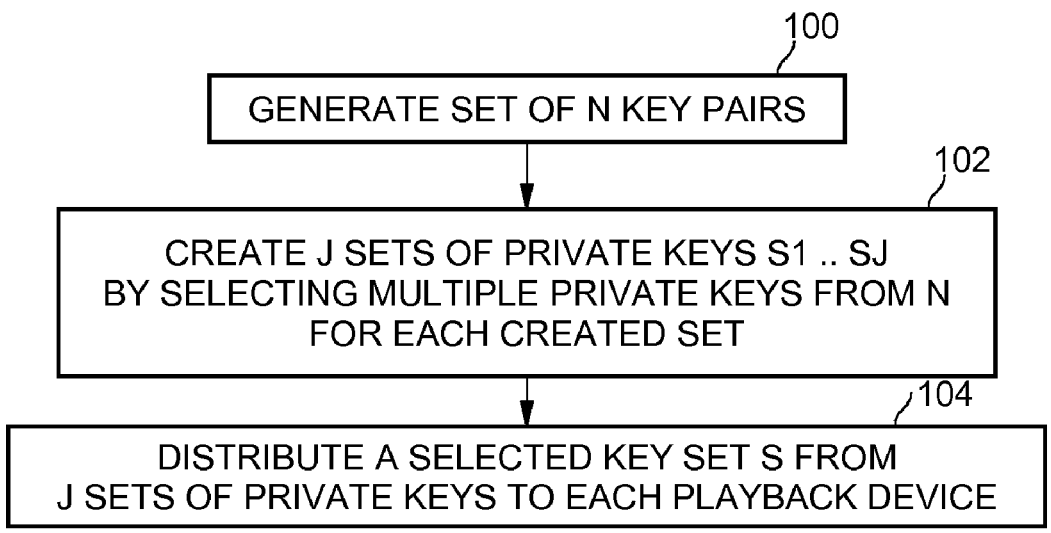
FIG. 2 is a flow diagram illustrating generating and distributing key sets to playback devices according to an embodiment of the present invention.

FIG. 2 is a flow diagram illustrating generating and distributing key sets to playback devices according to an embodiment of the present invention. At block 100, a key generating entity such as a content producer generates a set of N key pairs. At block 102, the entity creates J sets of private keys ($S_1, S_2, \ldots S_J$) by selecting multiple private keys from N for each set. Note that a particular private key in N may be a member of multiple sets in S. At block 104, the entity distributes one or more of the J key sets. In one embodiment, the entity may distribute a selected unique set $S_i$ to an individual playback device. In this way, each playback device manufactured by a device manufacturer may include a unique set of private keys.

Referring back to FIG. 1, when a content producer 10 desires to distribute content 16, the content producer encrypts 28 the content using a symmetric content key 30 to produce encrypted content 32. The encrypted content 32 may be stored as part of protected content 12 to be distributed to a playback device. The content producer also generates 34 a public key media key block 36 and includes the public key media key block as part of the protected content distributed to a playback device. The public key media block comprises a data structure (such as a table, for example) storing N items. Each item in the data structure comprises the symmetric content key CK 30 encrypted by one of the public keys from a public/private key pair from N, such that all of the public keys are used and each public key is used only once. Thus, the data structure includes (E(CK, $K_1$), E(CK, $K_2$), E(CK, $K_3$), ... E(CK, $K_N$)). In one embodiment, a hash value of the symmetric content key may also be computed and inserted into the public key media key block.

Figure 3:
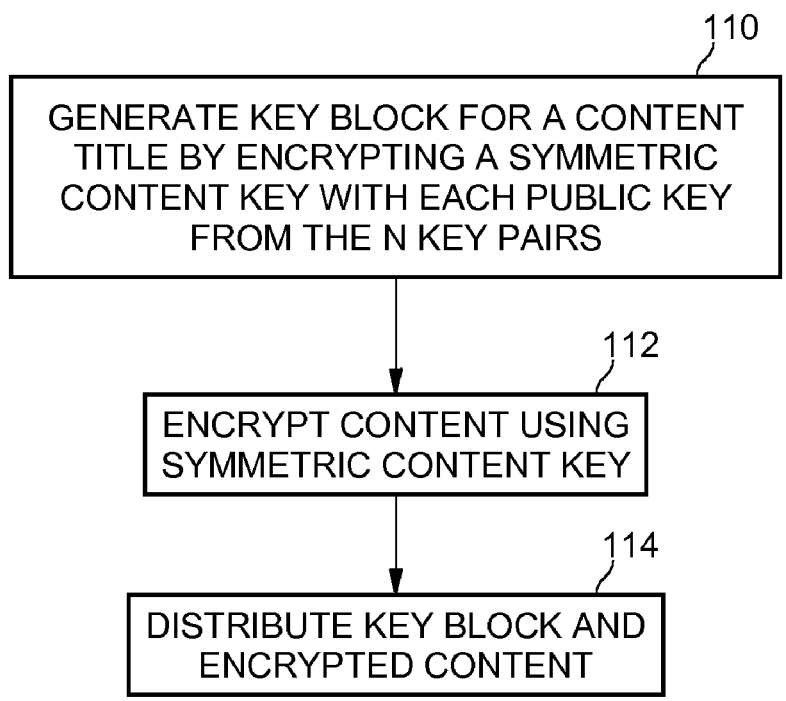
FIG. 3 is a flow diagram illustrating generating and distributing a public key media key block along with content according to an embodiment of the present invention.

FIG. 3 is a flow diagram illustrating generating and distributing a public key media key block according to an embodiment of the present invention. At block 110, the content producer generates a public key media key block for a content title by encrypting a symmetric content key with each public key from the N key pairs. This results in a data structure having N entries, each entry storing the symmetric content key encrypted by one of the N public keys. Optionally, the content producer also may compute a hash value of the symmetric content key and include the hash value in the public key media key block. In one embodiment, the content producer may, at his or her option, check for revoked symmetric content keys and substitute a dummy key (e.g., zero) for revoked entries in the public key media key block. In one embodiment, content producers may subscribe to a service which attempts to identify compromised devices and keys. At block 112, the content producer encrypts the content using the symmetric content key and a public key encryption algorithm. Both the encrypted content and the public key media key block may then be distributed together at block 114.

Referring back to FIG. 1, when a playback device 14 (one of the M playback devices manufactured) receives the protected content, the playback device uses a selected one of the private keys ($K_A, K_B, \ldots K_L$) from it's set of private keys $S_i$ to access an entry in the public key media key block 36 corresponding to the selected private key. The encrypted symmetric content key at that entry may be decrypted using the selected private key and a corresponding decryption algorithm. Once decrypted, the playback device may decrypt the encrypted content 32 using the decrypted symmetric content key and play back 38 the content 16.

Figure 4:
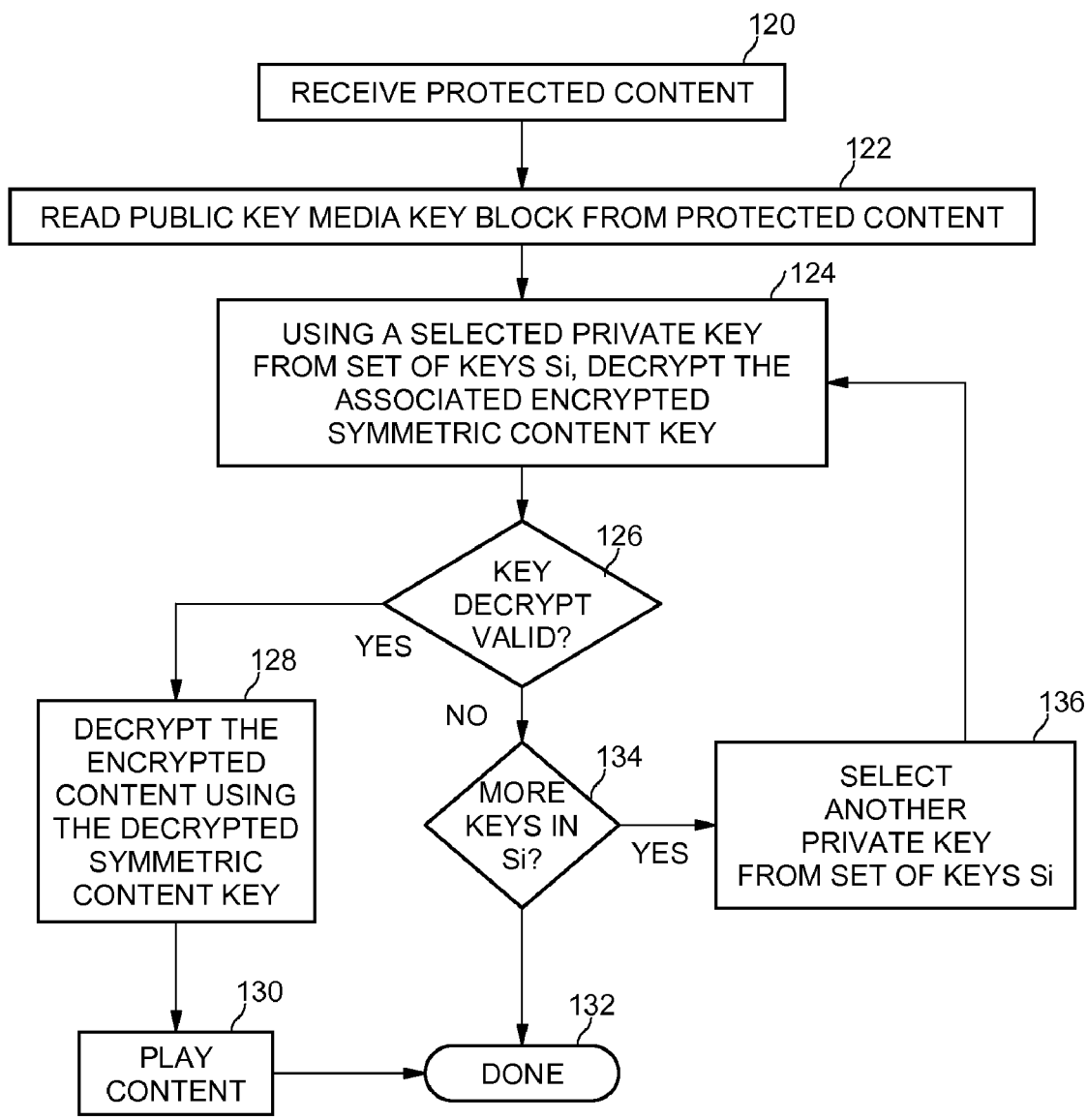
FIG. 4 is a flow diagram illustrating receiving and processing a public key media key block and encrypted content according to an embodiment of the present invention.

FIG. 4 is a flow diagram illustrating receiving and processing a public key media key block and encrypted content according to an embodiment of the present invention. At block 120, a playback device receives the protected content. In one embodiment, the protected content is stored on a storage medium, such as a DVD. In another embodiment, the protected content is received over a broadcast medium. At block 122, the public key media key block may be read from the protected content. At block 124, using a selected private key from the set of private keys $S_i$ stored in the TPM of the playback device, the playback device decrypts the associated encrypted symmetric content key. As noted above, in one embodiment, a hash value of the symmetric content key may be included by the content producer in the public key media key block. At block 126, the playback device determines if the decrypted symmetric content key is valid. In one embodiment, this may include computing a hash value of the decrypted symmetric content key (using the same hash algorithm as the content producer) and comparing that hash to the hash value from the public key media key block. If the hash values match, the private key is considered to be valid (i.e., not revoked), and processing continues at block 128. Other methods of determining the validity of the decrypted symmetric key may also be used. At this block, the playback device decrypts the encrypted content using the decrypted symmetric content key. At block 130, the playback device plays the content for perception by a user, and playback processing ends at block 132. If the decrypted symmetric content key is not determined to be valid at block 126, a check is made at block 134 to determine if more private keys in the playback device's set $S_i$ are available to be used. If more private keys are available in the set of private keys $S_i$, then another private key not yet selected may be selected from the set $S_i$ at block 136, and processing continues with attempting to decrypt the encrypted symmetric content key using the newly selected private key. This process may continue until the symmetric content key has been successfully decrypted or until all private keys in $S_i$ are tried. If no more private keys are available for use (e.g., that validly decrypt the encrypted symmetric content key) on this playback device, then processing ends at block 132. In this case, the playback device cannot play the content.

When a content producer becomes aware that a particular private key from the set of N key pairs is compromised, the content producer can revoke the authorization of that private key. In one embodiment, this may be accomplished by replacing the key pair in the N key pairs corresponding to the revoked private key with a new key pair. For all new content distributed after this replacement action, a distributed symmetric content key may be encrypted with a new public key. No public key corresponding to the revoked private key will be used such that the revoked private key stored on the existing playback device will be able to be used to successfully decrypt the encrypted symmetric content key. Furthermore, by replacing the revoked key pair with a new key pair, the overall number of available key pairs to use does not decline. Existing content will still play even on revoked devices. The revoked devices will not, however, be able to play new content. Changing the symmetric key doesn't really help for broadcast content, since it is compromised.

The number of keys blacklisted depends on the mechanism to detect compromise. If a rogue manufacturer produces devices using keys from one or more compromised devices, all the keys in the rogue device can be blacklisted. In an online scenario where a public key becomes too popular, and is therefore assumed to be compromised and widely distributed, only one key might be blacklisted.

In another embodiment, revocation of a compromised private key may be accomplished by substituting a known sentinel value (such as zero) for the encrypted symmetric key in the entry in the public key media key block corresponding to the revoked key pair in all subsequently distributed protected content. When the playback device attempts to decrypt the sentinel value in the public key media key block entry associated with the compromised private key, an invalid decrypt will be detected and no playback will occur. Thus, all subsequently distributed protected content may be secure despite a private key being compromised. However, this embodiment has the disadvantage of declining numbers of valid key pairs over time, as keys are revoked in response to attacks on the system.

In either embodiment, as keys are revoked, it becomes possible that a small number of "innocent" playback devices will be rendered inoperable for decrypting newly distributed content when their set $S_i$ includes only private keys that have all been revoked. The devices will still be able to play existing content. According to embodiments of the present invention, the probability of revocation of an innocent device may be minimized by appropriate selection of the number of key pairs N and number of private keys in each set $S_i$ referred to herein as L. Assume that the number of playback devices M cannot be strictly controlled (that is, manufacturers will desire to make and sell as many playback devices as consumer demand requires). Let R represent the expected number of revoked private keys. Let $E_V$ represent the tolerable expected number of revoked innocent playback devices. In one embodiment, it is desired that $E_V < 1.0$ (this means that an innocent playback device being rendered inoperable to decrypt existing content should not occur).

The following expression may be used to select the number of private keys L in a set $S_i$ stored in a playback device:

$$L > (\ln(E_V) - \ln(M)) / (\ln(R) - \ln(N)).$$

The anonymity benefits for embodiments of the present invention include that on-line, made-to-order content does not reveal the customer's identity (who provides a single public key). The key can belong to many devices. The same is true in a subscription list scenario, where each subscriber provides a public key, and the content is encrypted only to those keys belonging to one or more subscribers. For the broadcast scenario, where all keys are used, there is no anonymity issue—everyone potentially gets the content and the access to the content is protected by some other mechanism (such as CD sales, cable subscriptions, etc).

By using embodiments of the present invention, a playback device manufacturer can generate its own sets of private keys to embed within its playback devices and publish the corresponding public keys (by posting on the Internet for example). This invention removes the need for a centralized secure key generation facility and avoids security vulnerabilities associated with such a scheme. Once the public keys are published, anyone can use those public keys to become protected content producers. These new content producers can produce content, encrypt the content as described herein, and playback devices from the manufacturers will be able to decrypt and play back the protected content. Thus, the number of content producers using the present invention may be unlimited.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices (including consumer electronics devices such as DVD players and CD players), that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A playback device for accessing protected content, the playback device comprising:
  hardware components and instructions to work together to perform operations comprising:
  storing a unique set of L private keys selected from N asymmetric key pairs, where L and N are natural numbers;
  receiving protected content, the protected content comprising a public key media key block and content encrypted with a symmetric content key, the public key media key block comprising multiple versions of the symmetric content key encrypted with different public keys from the N asymmetric key pairs;
  using a private key selected from the L private keys stored by the playback device to decrypt one of the encrypted versions of the symmetric content key from the public key media key block; and
  upon successful decryption of the encrypted version of the symmetric content key, using the decrypted symmetric content key to decrypt the encrypted content stored in the protected content, and playing the decrypted content.

2. The playback device of claim 1, wherein the operations further comprise:
  if the selected private key does not successfully decrypt the encrypted version of the symmetric content key, using a second private key from the set of L private keys stored by the playback device to generate a decrypted version of the symmetric content key.

3. The playback device of claim 1, wherein the operations further comprise:
  terminating attempted playback of the encrypted content when no private key from the set of L private keys stored by the playback device successfully generates a decrypted version of the symmetric content key.

4. The playback device of claim 1, wherein the set of private keys is stored on the playback device during manufacture of the playback device.

5. The playback device of claim 1, wherein the operation of receiving protected content comprises receiving the protected content from a digital versatile disk (DVD).

6. The playback device of claim 1, wherein the operation of receiving protected content comprises receiving the protected content from a broadcast.

7. The playback device of claim 1, wherein L is sixteen and N is greater than one million.

8. A method for allocating keys to playback devices, the method comprising:
   generating a set of N asymmetric key pairs;
   creating J sets of private keys by selecting a unique combination of L private keys from the N asymmetric key pairs for each created set, where N, J, and L are natural numbers; and
   distributing the J sets of private keys for installation in playback devices, each playback device to store one of the J sets of private keys, to receive protected content comprising a protected content title and a public key media key block comprising multiple versions of a symmetric content key encrypted with different public keys from the set of N asymmetric key pairs, to use a selected private key from the stored set of private keys to decrypt one of the encrypted versions of the symmetric content key, and to decrypt and play the protected content title if the selected private key successfully decrypts the encrypted version of the symmetric content key.

9. The method of claim 8, wherein L is sixteen and N is greater than one million.

10. The method of claim 8, further comprising:
    revoking a key pair by replacing a compromised key pair in the set of N asymmetric key pairs with a new key pair.

11. The method of claim 8, further comprising: selecting the private keys for each of the J sets of private keys from the N private keys substantially at random.

12. The method of claim 8, further comprising:
    allocating different groups of the N private keys to different manufacturers.

13. The method of claim 8, further comprising:
    allocating different groups of the N private keys to different geographic regions.

14. The method of claim 8, wherein N is greater than or equal to one million, and J is between one and $N!/(L!*(N-L)!)$.

15. A method for producing protected content, the method comprising:
    storing protected content in a machine readable medium, wherein the protected content comprises:
    a public key media key block;
    and content encrypted with a symmetric content key;
    wherein the public key media key block comprises multiple encrypted versions of the symmetric content key encrypted with different public keys from a set of N asymmetric key pairs; and
    wherein the protected content in the machine readable medium causes a playback device to perform operations comprising:
    using a private key to decrypt a selected encrypted version of the symmetric content key in the public key media key block, the private key selected from a unique set of L private keys stored by the playback device, wherein N and L are natural numbers; and
    if the private key successfully decrypts the selected encrypted version of the symmetric content key, using the decrypted symmetric content key to decrypt the encrypted content, and playing the decrypted content.

16. A method according to claim 15, wherein the operation of storing protected content in the machine readable medium comprises:
    storing protected content that includes a hash value of the symmetric content key.

17. A method according to claim 15, wherein the operation of storing protected content in the machine readable medium comprises:
    storing the protected content in a digital versatile disk (DVD).

18. A method according to claim 15, further comprising: using different symmetric content keys to encrypt different content titles.

* * * * *